Dec. 21, 1937.   G. B. BAILEY   2,102,606
POWER TRANSMITTING APPARATUS AND CONTROL MEANS THEREFOR
Filed April 29, 1935
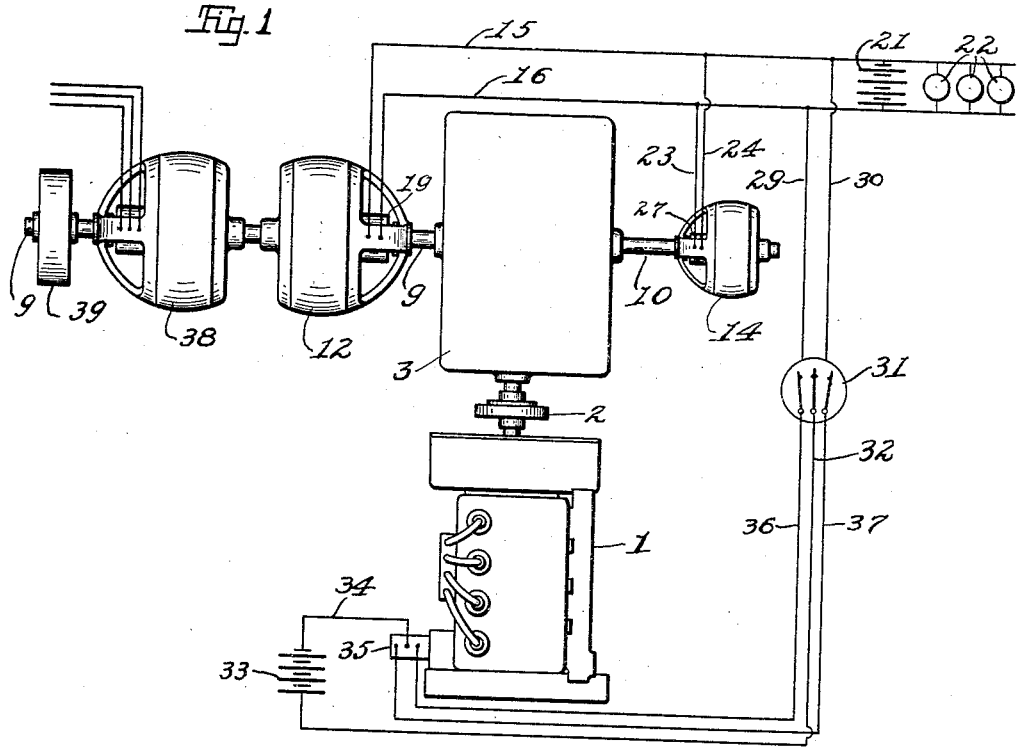
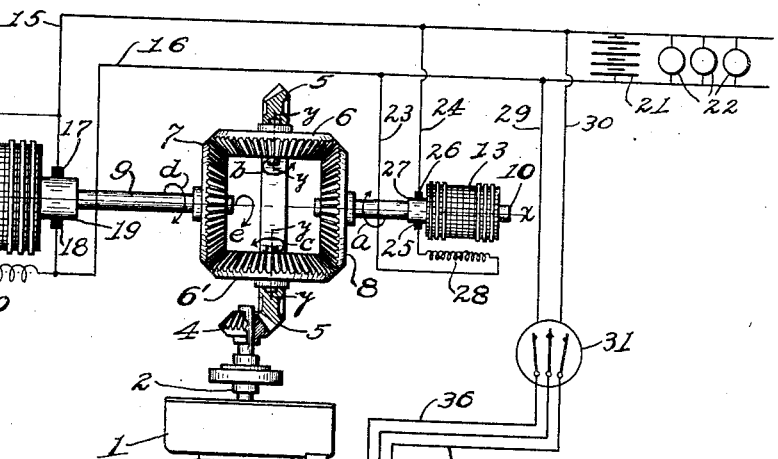
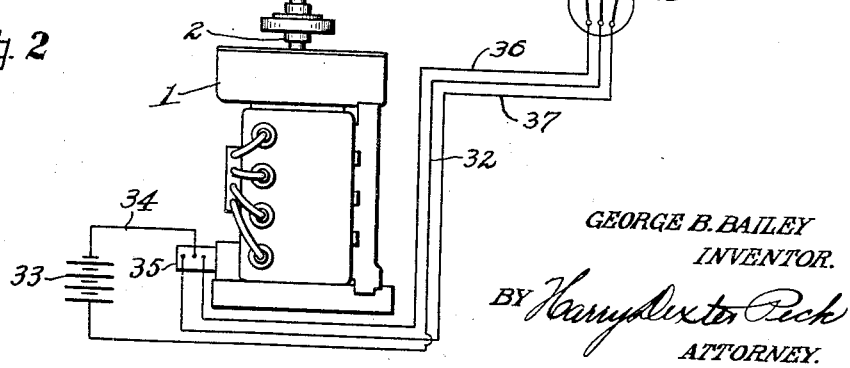
GEORGE B. BAILEY
INVENTOR.
BY Harry Dexter Peck
ATTORNEY.

Patented Dec. 21, 1937

2,102,606

UNITED STATES PATENT OFFICE 2,102,606

POWER TRANSMITTING APPARATUS AND CONTROL MEANS THEREFOR

George B. Bailey, Sharon, Mass.

Application April 29, 1935, Serial No. 18,721

4 Claims. (Cl. 290—7)

This invention relates to improvements in power transmitting apparatus and control means therefor. More especially it has to do with a novel combination of means whereby the speed of a driven element may be maintained substantially constant notwithstanding variations in load and whereby the prime mover for such element may be controlled in accordance with the load variations.

Where a driven shaft is to be run at approximately constant speed, or where the generation of a current with substantially constant voltage or cycles is desired, it has heretofore been necessary to maintain the speed of the prime mover correspondingly constant, or substantially so, regardless of variations in the load. Since the prime mover must be capable of providing for the maximum load whenever it occurs, its normal operating speed is usually determined by such load, and this speed is ordinarily maintained even when the load is greatly reduced. This is objectionable because needless power is generated in such cases during much of the operating time with consequent expensive consumption of fuel, maximum wear on the moving parts and, in many instances, harmful effect on the prime mover itself.

It is a principal object of this invention to provide power transmitting and control means which enable a driven element to maintain an approximately constant speed while regulating the speed or operation of the prime mover in accordance with the load imposed on the driven element. It is a feature of the invention that its principles may be applied to various types of prime movers and to different methods of furnishing power.

In the accompanying drawing, the principles of my invention are illustrated in their application to a prime mover driving a dynamo having electrical characteristics which cause it to run at a substantially constant speed and with a substantially constant voltage regardless of varying current output or input within the limits of its capacity. As shown somewhat diagrammatically, the electrical output of such a dynamo may be employed directly as power, or the rotation of its shaft may be utilized to drive machinery or apparatus where a substantially uniform speed is desired such as, for example, an alternator for producing alternating current. While the best mode in which I have contemplated applying the principles of my invention is shown in the accompanying drawing, this is to be taken as merely illustrative for it is intended that the patent shall cover by suitable expression in the appended claims whatever features of patentable novelty exist in the invention as a whole.

Figure 1 is a diagrammatic showing of apparatus embodying my invention; and

Figure 2 is another similar showing, somewhat more detailed.

Referring more particularly to the drawing, there is disclosed a Diesel internal combustion engine 1 as representative of any prime mover whose drive shaft 2 is suitably connected to a differential unit 3 which, for purposes of illustration, is shown in Figure 2 as a conventional type of differential gear. A pinion 4 on the drive shaft 2 meshes with a ring gear 5 of the differential unit and turns it about the axis $x$—$x$. Associated with this ring gear and carried by it are pinions 6, 6' which may individually rotate about their own axes $y$—$y$. These pinions mesh with gears 7 and 8, one of which is connected to a shaft 9 and the other to a separate shaft 10.

On shaft 9 is mounted the armature 11 of a dynamo 12 having the electrical characteristics of a shunt-wound or compound-wound generator. It is well known that such a generator will deliver a current having a substantially uniform voltage at a substantially constant speed or conversely will run at a substantially constant speed with a substantially constant voltage. The torque or output of this generator may vary materially within its working limits without appreciably affecting the potential of the current supplied by the generator, providing the speed of the generator is maintained substantially constant.

The other shaft 10 leading from the differential unit carries the armature 13 of a dynamo 14 having the electrical characteristics of a series-wound motor. In such a motor the torque bears an inverse relation to the speed, the torque tending to approach zero as the speed approaches infinity.

The main wires 15 and 16 leading from brushes 17 and 18 respectively, on the generator commutator 19, having the shunt-field winding 20 connected therewith and, as seen in Figure 1, may thence lead to a storage battery 21, or other voltage stabilizer, and thence to a load represented by a series of lamps 22. The wires 15 and 16 are also connected by wires 23 and 24 respectively with brushes 25 and 26 on the commutator 27 of the armature 13, and included in this circuit is the series-field winding 28 of the motor 14.

Wires 15 and 16 are also connected by wires 29 and 30 with a device 31 which responds to electrical changes in the line 15—16 and thereby affects the control of the prime mover 1. Wire 32 from the device 31 leads to a storage battery 33, or other source of power, from which wire 34 runs to a reversible motor mechanism 35 which controls the fuel or power input to the prime mover. Wires 36 and 37 also connect the reversible motor mechanism with the device 31. This device may be a volt meter which has been fitted with contact points in such a manner that an electrical circuit is completed upon an increase in voltage above a desired voltage or a second electrical circuit is completed upon a decrease in voltage below the desired voltage.

Referring now to Figure 2 and especially to the differential unit, it will be seen that gears 7 and 8 and the pinions 6, 6' are shown as of the same size. This is of course not necessary but is shown so to avoid any consideration of gear ratios. It is well known that in such a differential if one gear, for example gear 8, is driven in the direction of arrow $a$ and the ring gear 5 is simultaneously driven in the direction of arrow $e$, then the pinions 6 will rotate in the direction of arrow $b$, pinion 6' in the direction of arrow $c$, and the other gear 7 will be driven in the direction of arrow $d$. The speed of the latter will be a function of the speeds of the gear 8 and the ring gear 5. Advantage is taken of this last mentioned characteristic of the differential and, as will presently appear, the gear 8 is positively driven in direction opposite to that of gear 7, so that the gear 8 actually is used as a driving gear just as is ring gear 5.

As previously stated, it is desired to run shaft 9 at a substantially constant speed and to vary the speed or operation of the prime mover in accordance with the load on this shaft. Let it be assumed that shaft 9 and the generator 12 are being driven at a suitable speed and that the generator is producing a current flow in line 15, 16 sufficient to satisfy the demand of the load represented by the lamps 22, and also to drive the series-wound motor 14. That is to say, the prime mover 1 is being driven by some power input and drives the ring gear 5 of the differential while motor 14 is being driven by the current flow from generator 12 and likewise drives the gear 8.

Inasmuch as the speed on generator 12 is to be substantially constant the torque which it exerts is directly proportional to its output or load and therefore approaches a maximum as its load approaches a maximum. On the other hand, if the speed of the prime mover is to vary as its power output and it is to supply the power required by the system, as the load on generator 12 approaches a maximum the speed and the torque of the prime mover should both approach their maximum in which case the speed of the series motor 14 must decrease and approach its minimum. However, as mentioned before, the torque of a series motor increases as its speed decreases which is as required in this instance because the increase in the torques exerted by both the generator 12 and prime mover 1 on an increase in load must be balanced by the torque exerted by series motor 14. In other words, series motor 14 becomes an automatic torque balancer for the whole system, torque on which may be constantly changing due to varying load conditions. Except as the load is varying the system must be balanced, that is to say, the torque of the prime mover times its speed, plus the torque of the series motor times its speed, equals the torque of the generator times its speed.

The major purpose of the invention is to provide for the maintenance of the generator speed substantially constant. Its torque will vary directly with its load. Therefore if the torque of the generator is reduced by a falling off of the load, the power required to drive it at the desired speed is less. Accordingly, upon the falling off of the load, the invention provides for the reduction of power furnished by both the prime mover and the motor 14. This is accomplished as follows. As the load on the generator 12 or shaft 9 falls off, the speed is momentarily increased and causes an increase in voltage along the line 15, 16 and this is communicated by wires 29, 30 to the voltage responsive device 31. Such increase in voltage causes a circuit to be established through wires 32 and 37 and the reversible motor mechanism 35 to effect a reduction in the fuel or power supply to the prime mover. This causes the latter to slow down and deliver less power to the ring gear 5. Since the speed of the latter is thereby reduced, the speed of gear 7 and also the generator would likewise be reduced unless the speed of gear 8 was increased to maintain the desired speed of the generator.

However, as mentioned before, the characteristic of the series motor 14 which drives gear 8 is such that it is always endeavoring to increase its speed and in doing so its torque automatically decreases until a point is reached where the system is balanced.

Conversely, if the load on the generator is increased, it will momentarily slow down and the voltage in line 15, 16 will drop. This affects the device 31 to establish a current flow through wires 32 and 36 and the reversible motor mechanism 35 to effect an increase in the fuel or power supply to the prime mover 1. The latter will speed up and produce more power thus speeding up the ring gear 5. However, in this instance inasmuch as the speed of generator 12, shaft 9, and gear 7 is to remain substantially constant the speed of gear 8, and series motor 14 must decrease as the speed of ring gear 5 increases. In so doing the torque exerted by the series motor 14 increases until the system is again balanced. It is to be noted that in any event the speed of generator 12 remains substantially constant because the voltage on the system remains substantially constant within the limits of accuracy of voltage operated device 31, speed with which the prime mover responds to power input control device, and size of storage batteries 21, all of which are controllable factors.

By a proper selection of apparatus, the desired control can be exercised with most satisfactory results, and the speed of shaft 9 maintained with approximate uniformity. The generator will deliver a current as required by the load and at a substantially constant voltage. If an alternator 38 is also driven by shaft 9, then the alternating current may be generated with desired uniformity of cycles. And if the power of shaft 9 is to be transmitted mechanically, as indicated by the pulley 39, its rotative speed will be maintained substantially unchanged. Of course, the additional torques exerted on the system by such additional loads must be balanced by the series motor 14 and therefore care must be taken to select a series motor capable of exerting the maximum torque required at the minimum speed necessary.

I claim:

1. Power transmitting apparatus and control means therefor comprising, in combination, a prime mover; a dynamo driven thereby; power transmitting means connecting them including a differential unit; a second dynamo connected to said unit and adapted to impart power thereto; and control means actuated by variations in the electrical output of the first said dynamo, occasioned by changes of the load thereon, for controlling the power applied to said unit by both the prime mover and the second dynamo to maintain the speed of the first said dynamo substantially constant.

2. Power transmitting apparatus and control means therefor comprising, in combination, a prime mover; a direct current generator; power transmitting means connecting them including a differential unit; a direct current motor electrically connected with said generator and connected with said unit so as to impart power thereto; and control means responsive to changes in the electrical output of said generator, occasioned by changes in the load thereon, for varying the power output of the prime mover in accordance with said load changes; the said motor being capable of responding to said changes in the electrical output of the generator to vary the power imparted by the motor to the unit, thereby to maintain the speed of the generator substantially constant.

3. Power transmitting apparatus and control means therefor comprising, in combination, a Diesel engine; a direct current generator; a differential power transmitting unit connecting them; a series-wound motor mechanically connected to said unit and electrically connected to said generator in such manner that the operation of said motor corresponds with the electrical output of the generator; and control means responsive to changes in the electrical output of said generator and capable of varying the operation of said Diesel engine in accordance with the load on said generator.

4. Power transmitting apparatus and control means therefor comprising, in combination, a differential power transmitting unit; a Diesel engine connected therewith and arranged to impart a driving torque thereto; a direct current generator connected to said unit and arranged to receive a driving torque therefrom; a series wound motor mechanically connected to said unit and arranged to impart a driving torque thereto; and control means responsive to changes in the electrical output of said generator for varying the driving torque imparted by the engine in accordance with the load on said generator; the said motor being electrically connected to said generator in such manner as to be actuated in accordance with changes in the electrical output therefrom to balance the torque imparted to the unit, whereby the operating speed of the generator is maintained substantially constant.

GEORGE B. BAILEY.